F. O. HOAGLAND.
EXPLOSION GUARD.
APPLICATION FILED APR. 28, 1913.
1,086,707.
Patented Feb. 10, 1914.
Fig. 2
Fig. 1
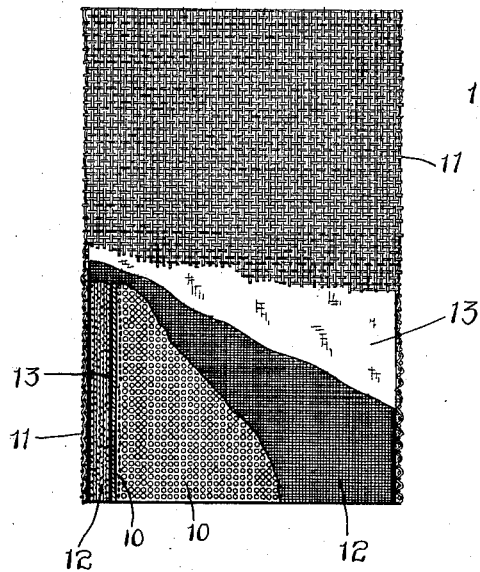
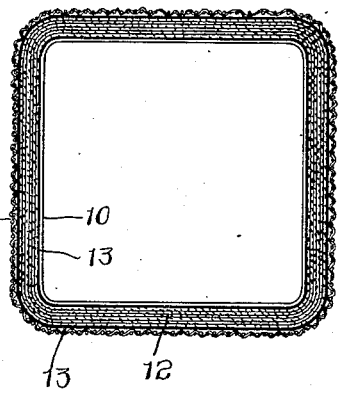
Fig. 3
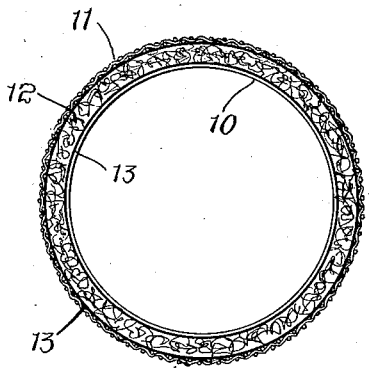
Fig. 4
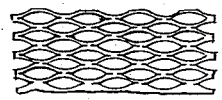
WITNESSES:
H. W. Meade
S. W. Atherton.
INVENTOR
Frank O. Hoagland
BY
A. M. Wooster
ATTORNEY
COLUMBIA PLANOGRAPH CO., WASHINGTON, D. C.

UNITED STATES PATENT OFFICE.

FRANK O. HOAGLAND, OF BRIDGEPORT, CONNECTICUT, ASSIGNOR TO THE UNION METALLIC CARTRIDGE COMPANY, OF BRIDGEPORT, CONNECTICUT, A CORPORATION OF CONNECTICUT.

EXPLOSION-GUARD.

1,086,707.

Specification of Letters Patent. Patented Feb. 10, 1914.

Application filed April 28, 1913. Serial No. 764,049.

*To all whom it may concern:*

Be it known that I, FRANK O. HOAGLAND, a citizen of the United States, residing at Bridgeport, county of Fairfield, State of Connecticut, have invented an Improvement in Explosion-Guards, (Case A,) of which the following is a specification.

This invention relates to guards adapted for general use wherever gun powder of any kind is stored or used, as in powder magazines, cartridge loading machines, etc.

It is a well known fact that if the gases of an explosion are not confined, very much less damage is done.

My present invention, therefore, has for its object to provide an explosion guard which shall afford effective protection for operatives upon cartridge loading machines and for persons whose duties require them to be near powder magazines by providing a guard adapted to surround the powder and so constructed as not to confine the explosion but to check it and to prevent the passage of powder dust.

In the accompanying drawing forming a part of this specification, Figure 1 is an elevation partly in section and partly broken away to illustrate the construction of my novel guard; Figs. 2 and 3 are cross sections illustrating different forms of guards, and Fig. 4 is a detail view illustrating expanded metal which may be used as a filling.

My novel guard consists essentially of an inner holding ply of pervious material indicated by 10, an outer holding ply of pervious material indicated by 11, and a pervious filling indicated by 12, both of the plies and the heat absorbing metallic filling acting to check but not to stop the passage of the gases of an explosion. The inner and the outer plies may be made of either finely perforated metal or of relatively coarse, strong wire netting. I have shown the inner ply as consisting of finely perforated metal and the outer ply as consisting of relatively coarse, strong wire netting, although if preferred the layer of relatively coarse, strong wire netting and the layer of finely perforated metal may be reversed, or either relatively coarse strong wire netting or finely perforated sheet metal may be used for both inner and outer plies, the essential feature being that both plies be thoroughly pervious so as to permit the passage of the gases of an explosion without danger of rupturing the guard. Between the inner and outer plies I place a pervious heat absorbing metallic filling which may consist of relatively fine wire netting wound closely in layers until the desired thickness is obtained. In practice I use several dozen plies of wire netting in these guards, any special number of plies or thicknesses of filling and any special thickness of the guards not being of the essence of the invention. This form of filling is clearly illustrated in Figs. 1 and 2. In lieu of plies of relatively fine wire netting I may use as a filling a plurality of piles of expanded metal of the character illustrated in Fig. 4; that is, sheet metal provided with closely placed slits in staggered relation, the metal then being stretched to open out the slits. If preferred, instead of relatively fine wire netting or expanded metal I may use as a filling steel wool, so called, as indicated in Fig. 3. It is immaterial what special form is given to the guards in cross section. They may be square, as in Fig. 2, or round as in Fig. 3. If made square or of any angular form, there is an additional yielding resistance to the force of an explosion which will tend to spring the guard to a circular form. Between the filling and the inner and outer plies I preferably place a ply of fine textile material indicated by 13. In practice I have used a silk fabric for this purpose on account of the fineness of its weave, which still leaves it thoroughly pervious. The object of these plies of textile material is to prevent the interstices of the filling from becoming clogged with powder dust.

When an explosion takes place, the force is of course equal in all directions. My novel guard does not resist the upward force of the explosion but checks its lateral force, at the same time permitting the gases to pass. I am thus able to effectually protect persons whose duties may require them to be near any ordinary quantity of powder which it is required to handle.

Having thus described my invention I claim:

1. An explosion guard consisting of inner and outer holding plies made of pervious material and a heat absorbing metallic filling between said plies likewise made of pervious material.

2. An explosion guard consisting of inner and outer pervious holding plies and a pervious heat absorbing metallic filling between said plies, said guard being angular in cross section.

3. An explosion guard consisting of an inner holding ply made of perforated sheet metal, an outer pervious holding ply and a filling between said plies made of pervious heat absorbing metallic material.

4. An explosion guard consisting of an inner holding ply of pervious material, an outer holding ply made of relatively coarse, heavy wire netting and a pervious heat absorbing metallic filling between said plies.

5. An explosion guard consisting of inner and outer holding plies of pervious material and between said plies a filling consisting of a plurality of plies of relatively fine wire netting.

6. An explosion guard consisting of an inner ply of finely perforated sheet metal, an outer ply of relatively coarse wire netting and a filling between said plies consisting of a plurality of plies of relatively fine wire netting.

7. An explosion guard consisting of inner and outer pervious holding plies, a filling of pervious heat absorbing metallic material between said plies and plies of textile material between the filling and the holding plies.

In testimony whereof I affix my signature in presence of two witnesses.

FRANK O. HOAGLAND.

Witnesses:
A. M. WOOSTER,
S. W. ATHERTON.

---

Copies of this patent may be obtained for five cents each, by addressing the "Commissioner of Patents, Washington, D. C."